US012809594B2

(12) United States Patent
Langton et al.

(10) Patent No.: US 12,809,594 B2
(45) Date of Patent: Nov. 24, 2026

(54) HYBRID CODE COMBINING IMPERATIVE PROGRAMMING LANGUAGES WITH DECLARATIVE DATABASE OPERATIONS TO ACCOMPLISH ITERATIVE LOGIC

(71) Applicant: AtScale, Inc., San Mateo, CA (US)

(72) Inventors: John T. Langton, San Mateo, CA (US); Patrick McDonald, San Mateo, CA (US); Jeff Curran, San Mateo, CA (US)

(73) Assignee: AtScale, Inc., Boston, MA (US)

( * ) Notice: Subject to any disclaimer, the term of this patent is extended or adjusted under 35 U.S.C. 154(b) by 11 days.

(21) Appl. No.: 18/367,188

(22) Filed: Sep. 12, 2023

(65) Prior Publication Data

US 2024/0086156 A1 Mar. 14, 2024

Related U.S. Application Data

(60) Provisional application No. 63/405,838, filed on Sep. 12, 2022.

(51) Int. Cl.
*G06F 8/35* (2018.01)
*G06F 8/30* (2018.01)
*G06F 16/242* (2019.01)

(52) U.S. Cl.
CPC .................. *G06F 8/35* (2013.01); *G06F 8/31* (2013.01); *G06F 16/2425* (2019.01)

(58) Field of Classification Search
None
See application file for complete search history.

(56) References Cited

U.S. PATENT DOCUMENTS 5,671,404 A * 9/1997 Lizee .................. G06F 16/2445 707/999.005
2003/0167261 A1* 9/2003 Grust .................... G06F 16/284
2010/0211939 A1* 8/2010 Ali ............................ G06F 8/42 707/E17.014

(Continued)

OTHER PUBLICATIONS

Blacher et al., "Machine Learning, Linear Algebra, and More: Is SQL All You Need?" CIDR, 2022. (Year: 2022).*

(Continued)

*Primary Examiner* — Ryan D. Coyer
(74) *Attorney, Agent, or Firm* — Armis IP Law, LLC

(57) ABSTRACT

A hybrid code construct combines imperative and declarative semantics for leveraging complementary features for a relational database exchange optimized for declarative access driven by imperative direction for imposing iterative and conditional looping behavior. Databases responsive to a declarative command structure receive declarative code generated from an imperative code sequence. The imperative code is based on a language that allows conditional iteration for repetitive commands, which invoke the declarative command syntax within a controlled loop or iteration. Declarative syntax, while enjoying optimizations for high performance database access, does not lend itself well to iterative logic common for linear regression and training of ML models. The hybrid code allows efficient ML training while the dataset defining the model remains within the database and need not incur network transport for AI based usage.

20 Claims, 9 Drawing Sheets

(56) References Cited

U.S. PATENT DOCUMENTS

| | | | | |
|---|---|---|---|---|
| 2010/0332548 | A1* | 12/2010 | Gibson | G06F 16/289 717/106 |
| 2012/0102472 | A1* | 4/2012 | Wu | G06F 8/434 717/137 |
| 2016/0117364 | A1* | 4/2016 | Jahankhani | G06F 16/2438 707/760 |
| 2017/0024434 | A1* | 1/2017 | Behnen | G06F 16/24534 |
| 2018/0329952 | A1* | 11/2018 | Ramachandra | G06F 16/90335 |
| 2020/0320069 | A1* | 10/2020 | Jeong | G06F 16/24522 |
| 2021/0165793 | A1* | 6/2021 | Jeong | G06F 16/24 |
| 2022/0147435 | A1* | 5/2022 | Dellatorre Borges | G06F 16/90324 |

OTHER PUBLICATIONS

Del Buono et al., "Transforming ML Predictive Pipelines into SQL with MASQ," ACM, 2020. (Year: 2020).*

Luo, Gang, "MLBCD: a machine learning tool for big clinical data," BioMed Central, 2015. (Year: 2015).*

Wang et al., "SQLFlow: A Bridge between SQL and Machine Learning," ACM, 2020. (Year: 2020).*

Jankov et al., "Declarative Recursive Computation on an RDBMS," ACM, 2020. (Year: 2020).*

Makrynioti et al., "sql4ml A declarative end-to-end workflow for machine learning," arXiv, 2019. (Year: 2019).*

* cited by examiner

HYBRID CODE COMBINING IMPERATIVE PROGRAMMING LANGUAGES WITH DECLARATIVE DATABASE OPERATIONS TO ACCOMPLISH ITERATIVE LOGIC

RELATED APPLICATIONS

This patent application claims the benefit under 35 U.S.C. § 119(e) of U.S. Provisional Patent App. No. 63/405,838, filed Sep. 12, 2022, entitled "ITERATIVE AND IMPERATIVE STRUCTURES IN DECLARATIVE DATABASE OPERATIONS," incorporated herein by reference in entirety.

BACKGROUND

Electronic databases store tremendous amounts of data and have been doing so for several decades ever since the cost of computer hardware came within reach for most businesses and consumers. Large "data warehouses" now store vast amounts of data stored and indexed according to a storage format, often in tables, and indices that allow access to the data though interfaces and software defined by the particular vendor. Such readily available volumes of storage facilitate training of machine learning models such as neural networks and random forests.

SUMMARY

A hybrid code construct combines imperative programming language semantics with and the declarative semantics of Structured Query Language (SQL) to achieve iteration or conditional looping behavior within relational databases to better support artificial intelligence algorithms. Databases responsive to a declarative command structure such as SQL receive declarative code generated from an imperative code sequence. The imperative code is based on a language that allows conditional iteration for repetitive commands, which invoke the declarative command syntax within a controlled loop or iteration, but may generate different SQL statements for submission on each iteration. Declarative syntax, while enjoying optimizations for high performance operations on large data sets, does not lend itself well to iterative logic required for training of most ML models. Imperative code efficiently supports iterative programming semantics but can only operate on the amount of data that can be loaded into working memory. The hybrid code does not load data into working memory but enables the iterative logic necessary for ML training to execute in a declarative manner on a relational database, without moving the data. This approach circumvents the memory limits faced by imperative programming languages, leverages the ability of databases to access and execute computation on massive amounts of data, but also supports iteration which is not supported in SQL.

Configurations herein are based, in part, on the observation that relational databases remain a popular choice for storage of large data sets due to a tabular storage structure providing powerful and efficient querying capability across multiple data sets. Structured Query Language (SQL) remains a preferred language for relational database access due to the intuitive, mnemonic syntax. Conventional relational database applications suffer from the shortcoming of the declarative nature of SQL and difficulty in implementing iterative, condition-based loop structures. Conventional remedies to perform iterative control in SQL access may need to rely on non-standard or specialized SQL variants.

Accordingly, configurations herein substantially overcome the shortcomings of conventional SQL enhancements by providing a hybrid code approach for generating declarative SQL statements for efficient database access under the control of imperative code invoking iterative and condition terminated looping control over the generated SQL statements while those SQL statements still adhere to ANSI SQL syntax.

In further detail, in a relational database environment having large databases responsive to declarative statements, a hybrid code approach for training a machine learning model includes iterative code generating and submitting declarative SQL statements to a database in an iterative loop. The imperative code allows iterative, or looping constructs that generate declarative code as output of each loop that is then executed, on the database, during that iteration. The database command directs the processing power of the SQL engine in the database, which incorporates powerful computation capability in modern SQL implementations. In an example configuration for training an ML model, the imperative code iterates in a loop, and with each loop iteration generates declarative code that is submitted to the database as a SQL command.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Various configurations depicting the above features and benefits as disclosed herein are shown and described further below. Configurations depicted below present hybrid code examples of relational database access responsive to SQL generated by imperative code. The presented examples include training of an ML model defined or represented, at least in part, as a relational data set in a SQL database driven by hybrid code for issuing training iterations. In practice, it is likely that the model is not stored only as a table. Its parameters would be stored in a database table, however, the full definition of the model would generally include the definition of a view which includes SQL logic.

American National Standards Institute (ANSI) SQL evolved as logical syntax for retrieving, and performing computations on, tabular data from databases. Modern SQL has evolved to provide substantial computational capability for generating statistical and analytical results, inline with artificial and machine learning uses. Rather than merely storing and retrieving data, SQL commands allow powerful processing and synthesis of data in the database, where the SQL processor/server provides optimal efficiency due to direct access and proximity to the stored data. In effect, as will be shown below, SQL commands issued to the database perform significant operations on the data on the database server, without even requiring a retrieval into a host processor. One major shortcoming of the SQL command syntax is control of iterations and looping. Hybrid code including imperative language structures such as Python iteratively generating the SQL commands helps impart such iterative and controlled looping to generated SQL.

Figure 1:
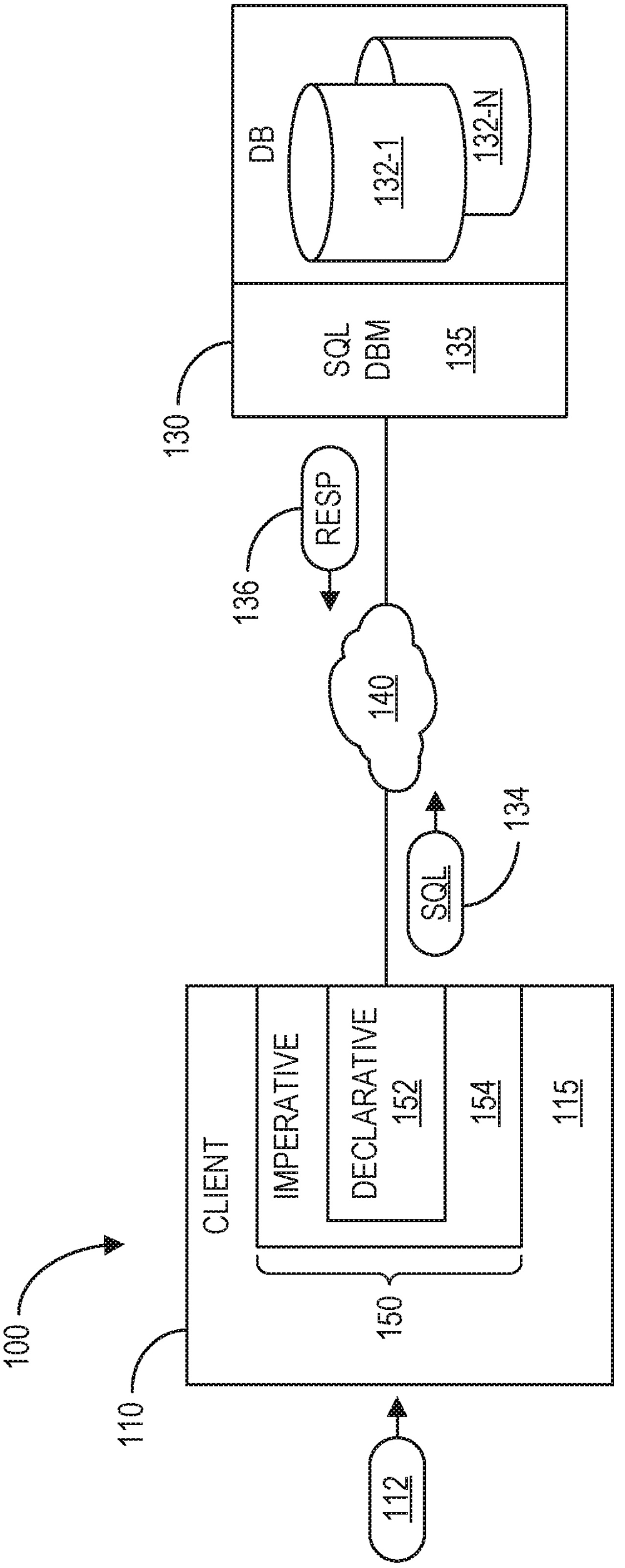
FIG. 1 is a context diagram of a database environment suitable for use with configurations herein.

FIG. 1 is a context diagram of a database environment suitable for use with configurations herein. Referring to FIG. 1, in a database environment 100 having large databases, client computer systems (client) 110 launch and execute applications that receive requests 112 for database access. The client 110 employs database command logic 115 defined by code written in one or more suitable languages, such as .Net, Python, Java and others. A queried database (database) 130 includes one or more datasets 132-1 . . . 132-N, each defined by a file or table of tabular or unstructured data, stored on one or more physical storage volumes, and controlled by a database management system (DBMS) responsive to a SQL statement 134. The database (DB) 130 often resides across a network 140 from the client 110, and may itself be distributed across multiple network locations for storage of all the datasets 132 under control of the DBMS 135, often specific to a vendor or software standard.

The DBMS 135 expects a particular command syntax, and in the case of a relational DB, is often in the form of a SQL statement 134; conversely, the client generates a SQL request via the database command logic. Due to the industry popularity of SQL and the evolved capability of SQL conversant DBMS 136 implementations, clients 110 are often bound to generate SQL forms from the database command logic, regardless of the languages employed by the client applications. Imperative languages, such as Python and C, employ features and constructs that mandate HOW the logic progresses. Declarative languages, such as SQL, denote WHAT the user wants, not how to get it. SQL allows for powerful expressions, often rich in Boolean logic, but devoid of an ability to direct control or iteration.

Many SQL implementations observe an established standard implementation of SQL. In particular, the American National Standards Institute (ANSI) defines the Structured Query Language (SQL). Code written in compliance with this language can execute on any database (DBMS or DB engine) supporting the standard. Further, SQL is supported by a plurality of data warehousing technologies including relational databases, non-relational databases (e.g. Apache Hive), cloud databases (e.g. Athena), and even "No-SQL" databases such as MongoDB.

As stated above, SQL is a declarative programming language and describes the logic to be performed, but not the control flow. The query planner and database engine determines the control flow and order of operations. This is in contrast to imperative programming languages (e.g. Python, Java, C, C #) which explicitly define control flow and operation steps.

Adherence to standard (ANSI) SQL provides a number of advantages, including but not limited to the following:

SQL is well known;

code can be written once and then run in any database that supports SQL;

the database engine can optimize performance of the operations to be performed and control flow based on information about the data, hardware, and logic in the operations; and code can be written once and still leverage improvements to database implementations.

Configurations herein refer to programming languages for defining preprogrammed logic directing the course of automated processing. Code is generally a human readable text form that follows a predetermined syntax for conversion or translation to machine readable instructions, sometimes referred to as "machine code" or "object code" (the distinction of machine and object code are noteworthy but not particularly relevant to the disclosed approach). Machine/object code defines processor based instructions that manipulate computer memory locations and computations. The translation between human readable code and machine language instructions can occur in several ways. Compilation translates a human readable code file into the executable machine code, often prior to execution time. Interpretation occurs when the human readable code is translated piecemeal, as it is received. Most languages often fall into these categories of compiled or interpreted languages.

Continuing to refer to FIG. 1, configurations herein demonstrate a nesting or "wrapping" of declarative SQL code 152 instructions generated by imperative language code 154 with conditional iteration and looping constructs in a hybrid code construct.

Figure 2A:
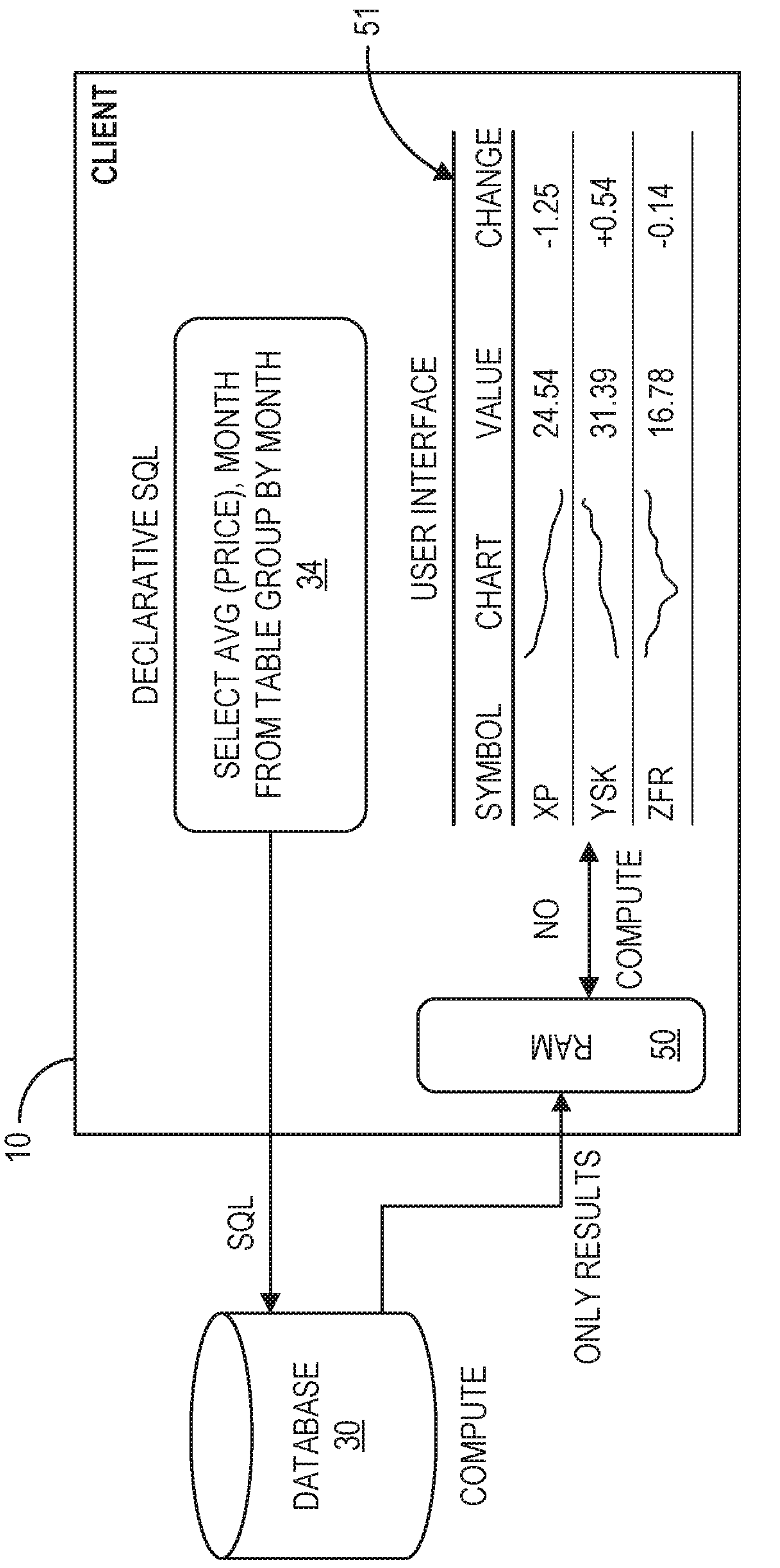
(PRIOR ART) FIG. 2A
FIGS. 2A-2C are block diagrams of prior art SQL statement logic constructs.
Figure 2B:
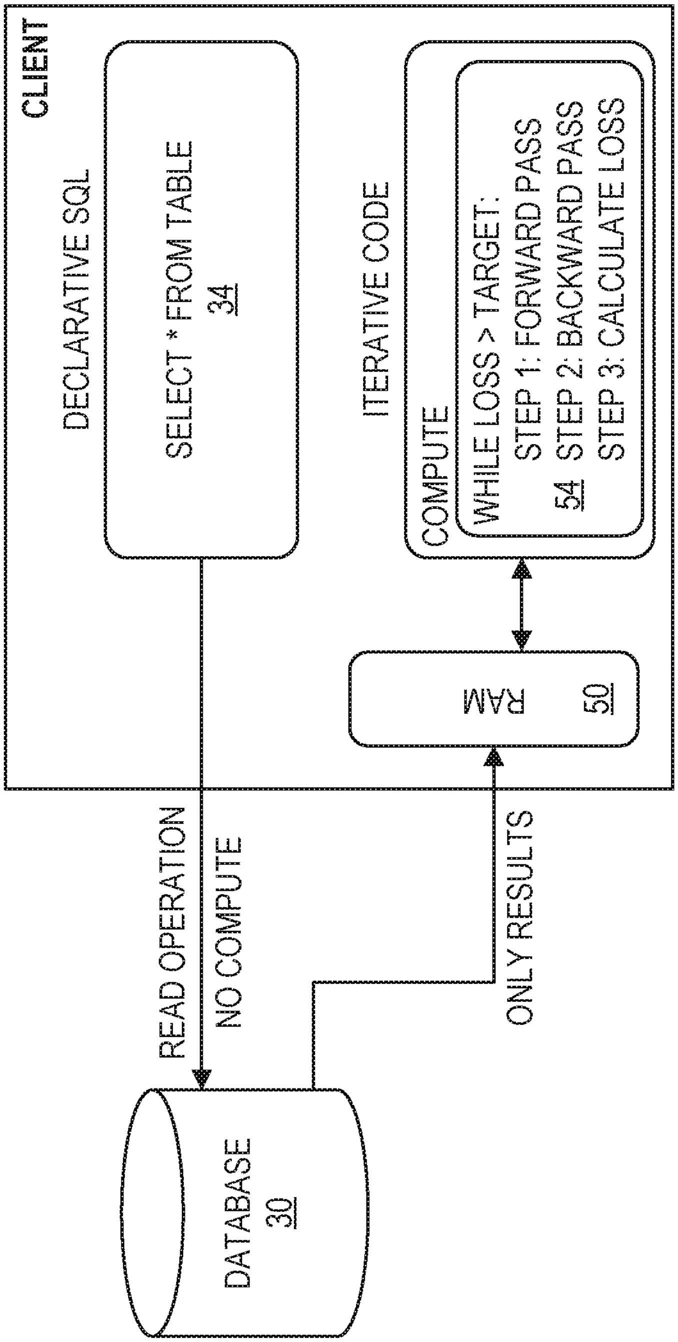
(PRIOR ART) FIG. 2B
Figure 2C:
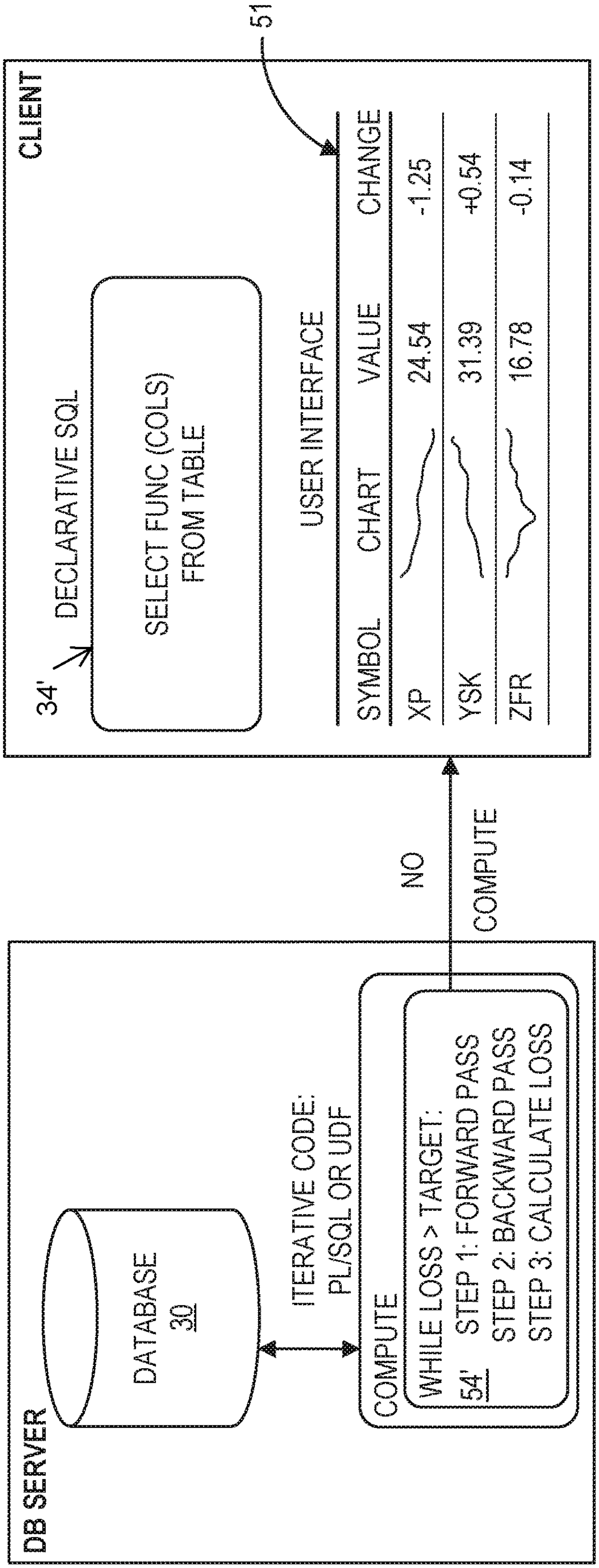
(PRIOR ART) FIG. 2C

FIGS. 2A-2C are block diagrams of prior art SQL statement logic constructs. FIG. 2A shows a conventional standard interaction between a client 10 and database 30. Logical operations to be performed are written in SQL, represented by a statement 34, and submitted to the database 30. The actual computation that is described in the SQL is performed in the database such that only the results are returned to the client 10. As a result, little to no computation is performed on the client 10 side. The results are loaded into RAM 50 on the client side and displayed to the user in the form of an application and/or GUI (Graphical User Interface) rendering 51. Database processing and logic is therefore limited by the capability of the declarative SQL syntax.

A major disadvantage of conventional coding in SQL is the lack of a straightforward method to define iteration or loops. Machine learning algorithms generally require iteration. For example, gradient descent is a common, iterative approach in multiple machine learning algorithms such as neural networks. The general idea is to iteratively minimize a loss function by permuting the values of the model (e.g. weights in a neural network) in each iteration. Once the loss cannot be minimized further, the iterations stop, and the resulting model is the solution.

Machine learning algorithms are typically written in imperative programming languages such as Python because of native iteration support. A problem is that data often resides in data warehouses that support SQL, not imperative programming languages, which support iteration. As a consequence, data must be read out of the database and a copy made in the random access memory (RAM) 50 for iterative algorithms (e.g. machine learning) to be able to access and operate on it. For a large dataset 132, often required for ML/AI approaches, this incurs substantial storage demands and network overhead.

FIG. 2B shows a common workflow for modern machine learning with pseudo code 54 for performing the machine learning algorithm for gradient descent and backpropagation. A declarative SQL statement 34 does not perform computation but rather reads data from the database 30 into RAM 50. The imperative pseudocode 54 performs the computations for gradient descent and backpropagation. The "while" statement creates the iterative loop that continues until the loss value is less than or equal to some target. With each iteration, there are a number of steps that operate on the data in RAM. The iterative operations are written in an imperative programming language, such as Python, and performs all of the computation within the client.

A primary disadvantage of the approach of FIG. 2B is that RAM is a limiting factor on how much data can be read and operated on by the algorithm. Platforms such as Spark™ and H2O mitigate this limitation by using clusters of machines with significant amounts of RAM that are pooled for use. However, use of these platforms increases complexity and cost of machine learning operations. Further, this approach still requires moving data, often to intermediary storage such as file stores, and ultimately into RAM for the algorithms to proceed. Moving the "big data" that is often required for AI algorithms introduces a great deal of overhead.

Another disadvantage of this approach is that the models produced are still within the client in a programming language not understood by the database. Additional work is required to use the models to make predictions or inferences and then write those results back into the database, incurring additional data movement overhead. This is generally referred to as "model serving" in machine learning operations (MLOps).

Finally, this approach does not take advantage of the optimizations of database engines and query planners that have been developed over decades to work efficiently with large amounts of data. SQL implementations enjoy a longstanding reputation as a preferred syntax for relational table and DB access, and access algorithms reflect the efficiency and performance of years of industry evolution.

Due to these shortcomings, conventional approaches have attempted to implement iteration in database management systems, on the database 30 server and processor. One conventional approach is to implement iteration in Procedural Language for SQL (PL/SQL) or a user defined function (UDF) that is then compiled and installed in the database. FIG. 2C shows a notional example.

Referring to FIGS. 2A-2C, while the approach of FIG. 2C moves computation back to the database server (DB) 30, there are a number of challenges and disadvantages. The primary complication is that the SQL syntax for calling the imperative code (i.e. a function in PL/SQL or UDF) is not part of the ANSI SQL standard. As such, it does not leverage the advantages of SQL and compounds other shortcomings.

In the approach of FIG. 2C, a conventional approach performs computation on the DB side, and avoids network transport and duplicative memory requirements. SQL extensions 34' or "hooks" are employed for transferring control to external functions. Execution transfers control to the external procedure or function 54' residing on the database 30 (actually on a server or computing resource appurtenant to the DB).

Such imperative code written in PL/SQL or in another language as a UDF bypasses the database engine and query planner, eliminating the benefits of their optimizations altogether. Additionally, the code must generally be interpreted prior to execution, which incurs processing overhead that is not imposed by operations specified in standard SQL. PL/SQL uses SQL but then adds a layer of context switching and memory management for iterative operations that incur computational overhead. PL/SQL is compiled to bytecode which must be interpreted, adding a layer of abstraction and computational overhead. Interpreting the bytecode of a function that has been installed in the database generally requires the database to load a virtual machine that can interpret the language in which the function was written. These different languages may perform memory management in a manner that fundamentally differs from C and may impose substantial performance degradation. Finally, this approach requires installation of the UDF on the database.

Figure 3:
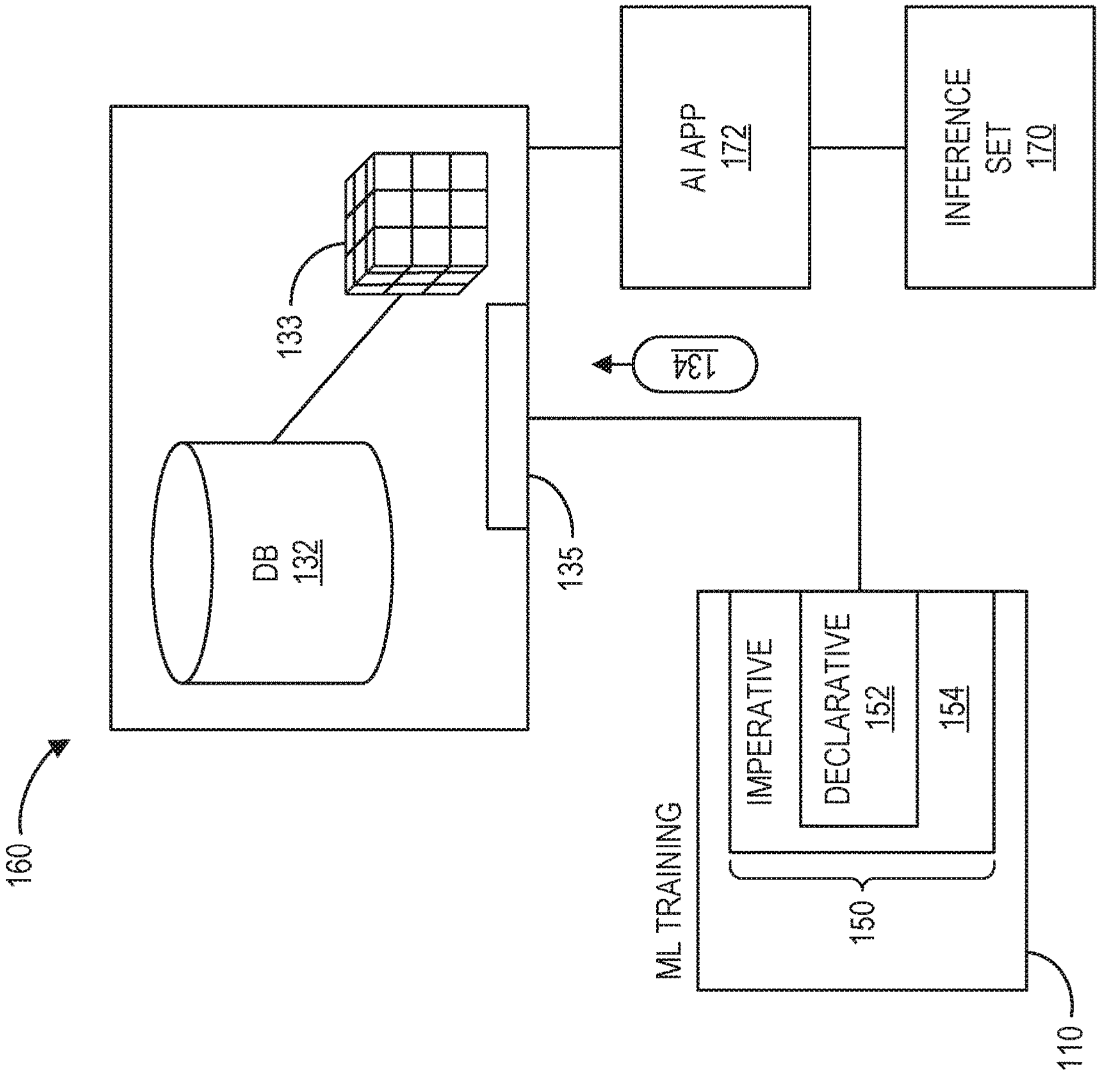
FIG. 3 is a block diagram of an inference engine using the hybrid code of FIG. 1.

As alluded above, a beneficial implementation of hybrid code is ML learning and production. FIG. 3 is a block diagram of an inference engine using the hybrid code of FIG. 1. Referring to FIGS. 1 and 3, the client 110 determines iterative logic for training a model, where the model is defined by a database table of columns, often corresponding to features and rows, such as a relational table or similar tabular form. In databases, there are tables, columns and rows. In an ML model, the features for the machine learning algorithm will often correspond to columns in the database, and the model will be represented by a combination of tables, columns, and rows representing model components such as connection weights in neural networks, or coefficients in linear regression.

One of the features of the disclosed approach is for execution of iterative (looping) instructions for a logical syntax, where the logical syntax may be inconsistent with iteration, such as is the case with SQL. The model is trained by repeated (looping) generation of database commands defined by the generated SQL statements that contain the syntax for training the model formed by the database table or tables. The client 110 invokes imperative code 154 for implementing and submitting a plurality of SQL statements 134. In the example configuration, iterative code segments of Python generate database commands in a text or string form that define the database instructions for training the model. The imperative code 154 takes the form of a segment, sequence or program of instructions in an imperative language such as Python. Following launch, execution of the imperative code 154 generates and submits an instruction statement defined by declarative code 152 and configured for accessing the database for implementing the iterative logic. The imperative code continues executing the iterative logic, and generating SQL statements for submission, until a termination condition is evaluated and determined by the imperative code 154, triggering an exit condition that effectively terminates the looping construct around repeated generation of the declarative code 152 and submission to the database. The imperative code inspects the threshold and determines whether to stop generating and invoking the declarative code.

The examples herein depict SQL as the declarative language and Python as the imperative language. For training an ML model 160 stored in a relational DB, as a view, table, or other suitable DB construct, the model 160 defines a neural network accessed (trained) via iterative logic using SQL statements applied to the database table or dataset 132.

SQL is Turing complete and fully capable of executing the mathematical and logical operations in machine learning algorithms. The primary reason these algorithms have not been implemented in SQL is because of the complexity of defining their iterative operations in a declarative manner.

The proposed approach implements algorithms (e.g. machine learning algorithms such as linear regression) that entail iterative operations in a hybrid of imperative and declarative programming languages. Within hybrid code, the imperative code segments orchestrate iteration of operations (i.e. looping), however, the actual operations are performed by declarative code. Specifically, the imperative code loops and within the loop it automatically generates declarative code and submits it to a database for execution. Each iteration of imperative code dynamically generates declarative code based on results of the last iteration as well as hyperparameters provided for training the algorithm. The hybrid code minimizes computation and memory use within the imperative code sections and maximizes computation and memory use within the declarative sections. This approach leverages the optimizations of database engines and query planners for memory management and computation (declarative code e.g. SQL) while supporting iteration (imperative code, e.g. Python). Partial results for iteration steps are stored in temporary views or tables as necessary in the database so that data need not be "read in" or transferred from the database 130 to the client 110.

The proposed approach may be deployed in different ways, including but not limited to a programming language interface or software as a service (SaaS). One useful implementation and deployment of the proposed approach involves a Python library entitled AI-Link, marketed commercially by AtScale, Inc., of San Mateo, CA. AI-Link provides users access to machine learning algorithms implemented in hybrid code. The method signatures are similar to those for the same algorithms in Scikit-learn, a popular library for data science and machine learning. This approach enables data scientists to use familiar syntax in a familiar programming language. For example, Table I shows a workflow and set of method calls for executing principal component analysis in scikit-learn, while Table II shows an analogous workflow and set of method calls in AI-Link.

TABLE I

| | |
|---|---|
| In [4]: | from sklearn.decomposition import PCA<br>pca = PCA(n__components=4)<br>pca.fit(data) |
| Out[4]: | PCA(n__components=4) |
| In [6]: | pca.components__.T |
| Out[6]: | array ([[ 0.36138659, 0.65658877, −0.58202985, −0.315487193],<br>[−0.08452251, 0.73016143, 0.59791083, 0.3197231 ],<br>[ 0.85667061, −0.17337266, 0.07623608, 0.47983899],<br>[ 0.3582892 , −0.07548102, 0.54583143, −0.753657433]]) |
| In [8]: | [x * 100 for x in pca.explained__variance__ratio__] |
| Out[8]: | [92.46187232017272, 5.306648311706782, 1.7102609807929765, 0.5212183873275376] |

Figure 4:
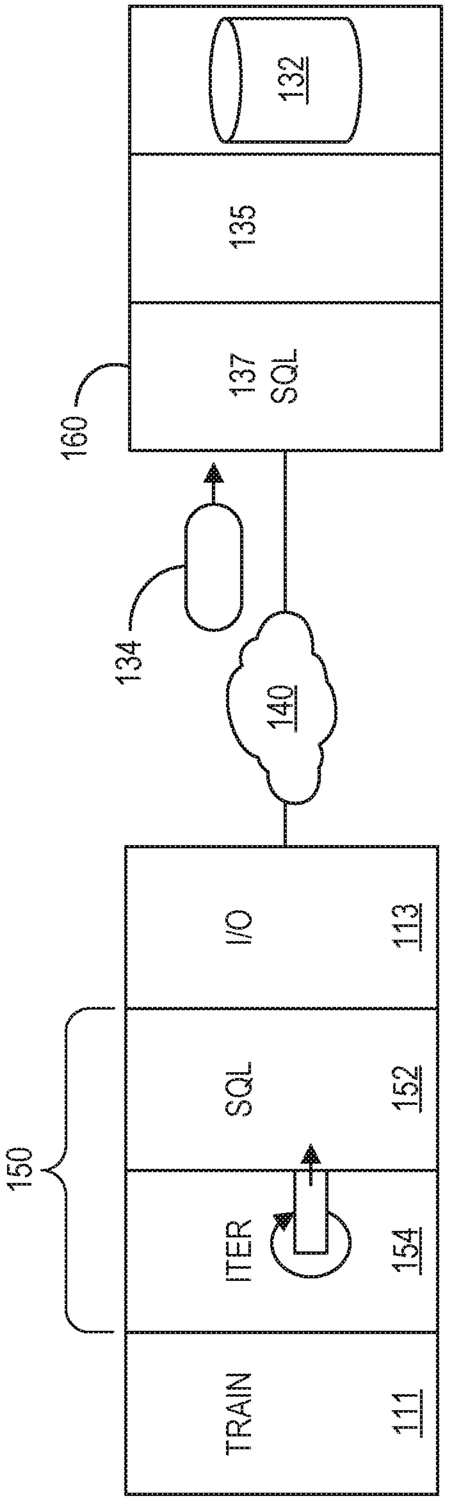
FIG. 4 is an architecture diagram of a computer system implementing the hybrid code of FIG. 3.

FIG. 4 is an architecture diagram of a computer system implementing the hybrid code of FIG. 3. Referring to FIGS. 1, 3, and 4, the hybrid code 150 is implemented as a nested or layered architecture, where the training logic 111 executes on the client, invoking functions in the imperative code 154, driving declarative SQL code 152, often in a looping, iterative manner for generating SQL statements, which are handed to native I/O (input/output) and network code 113 for network 140 transport to the database 160. At the database 160 side, a SQL interpreter 137 receives the SQL statement 134, where the DBMS software 135 implements the data access, retrieval and computation functions for training the ML model.

Returning to FIG. 3, the training logic 111 likely employs a training set or initial data set, used in iterative learning/training instructions. Following training, the model is ready for use in inferring, classifying or predicting values in a production phase. An inference set 170 of one or more data items for inference is received by an AI application 172 for invoking the model, implemented in the DB 160. Iteration is no longer required on a trained model; the trained values are now stored as a relational table and/or view 132.

As indicate above, the model typically is generated/initiated in a training phase, then passes to a production or deployment phase once learning has achieved sufficient maturity. Computation is being provided to the data within the database where it resides to create a model. This is all about model training. In the beginning, there is no model. The hybrid code trains a model. Executing imperative code kicks off the training at the beginning. After that, there is a loop. On every loop, there is computation, that moves the model forward. So after the first loop, there is a type of "partial model.". In other words, executing imperative code that initiates training of a machine learning model on data within the database commences the process.

TABLE II

In [16]:

```
from atscale.utils import eda
pca, weights = eda.pca(dbconn=snowflake_connection,
                       data_model=data_model,
                       pc_num=(,
                       numeric_features=[ 'SEPAL_LENGTH_CM',
'SEPAL_WIDTH_CM', 'PETAL_LENGTH_CM',
'PETAL_WIDTH_CM' ]
                       categorical_features=[ 'ID_150' ])
```

In [17]:

pca

Out [17]:

| | pc_1 | pc_2 | pc_3 | pc_4 |
|---|---|---|---|---|
| 0 | 0.361357 | 0.556588 | −0.582330 | 0.315487 |
| 1 | −0.084523 | 0.730162 | 0.597910 | −0.319723 |
| 2 | 0.856671 | −0.173373 | 0.76236 | −0.479539 |
| 3 | 0.355285 | −0.075481 | 0.545831 | 0.753658 |

In [18]:

weights

Out [18]:

| | pc_1_percent_weight | pc_2_percent_weight | pc_3_percent_weight | pc_4_percent_weight |
|---|---|---|---|---|
| 0 | 92.461572 | 5.305648 | 1.710261 | 0.521218 |

Users would invoke hybrid code by calling a method in AI-Link as shown in Table II. The rest of the processing is performed by hybrid code within the library.

Figure 5:
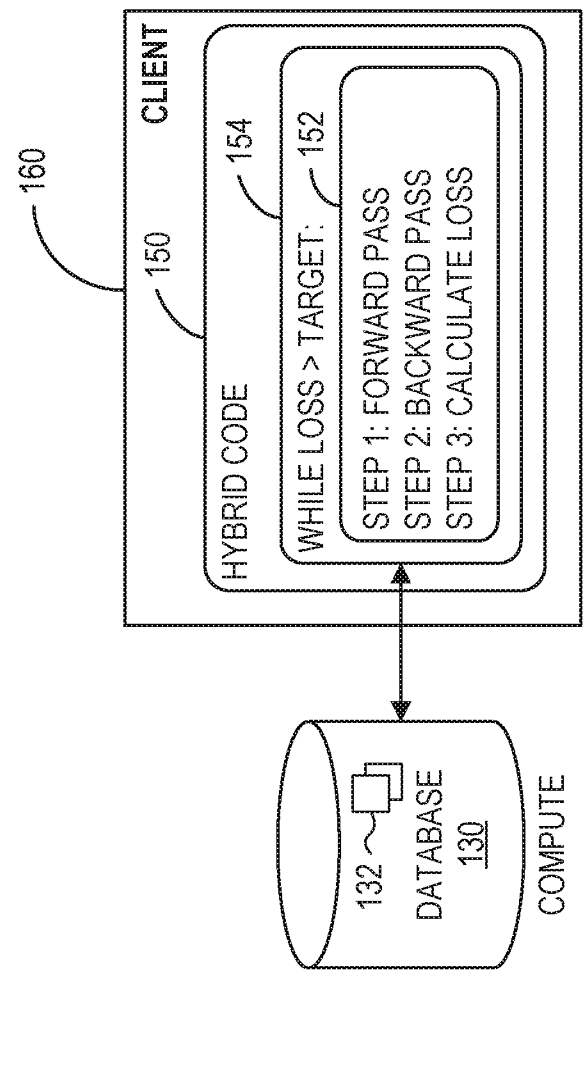
FIG. 5 is a diagram of an integration of declarative and imperative code in a hybrid code implementation.

FIG. 5 shows a notional example with a sample iterative backpropagation algorithm used by neural networks. FIG. 5 depicts integration of declarative 152 and imperative code 154 in a hybrid code 150 implementation wherein the imperative code defines a sequence including a forward pass, a backward pass, and a loss calculation. Computation occurs based on the declarative code. Based on results, weights are updated and then another iteration occurs until the termination condition. The dataset 132 effectively defines features in an ML model, based on declarative code for adjusting weights of the features. The termination condition, evaluated by the imperative code repeats the generation and submission of the declarative code. Iteration is therefore controlled by the imperative code and termination based on an evaluation of the loss function.

In the foregoing example, the SQL logic is declarative code 152 and is invoked by the logic of the imperative code 154 (surrounding box). The imperative code automatically generates the SQL, iteratively as per the imperative code 154, and submits it to the data store for execution in a similar manner to an individual, declarative SQL statement, and of course repeats generation of successive SQL statements until satisfaction of the termination condition, by evaluation in the imperative code. Specifically, steps one, two, and three are independent SQL statements that would be executed on the database and the results stored in temporary tables. Steps 1 and 2 effectively performs several calculations including but not limited to pooling, activation, and modification of model weights within a neural network. Step 3 calculates the loss function, which is a measure of how well the model fits the data set. The results would then be read from the database and the imperative code determines whether to continue iterating in the while loop. If the loss is greater than the target value, iteration continues. The declarative code 152 performs the computation and stores partial results in the database. The imperative code 154 need only orchestrate the iteration. The only memory the imperative code would utilize would be to read the partial results of calculated loss to determine whether to stop the iteration. Hence, large data stores need not be transported or stored in client RAM; the only compute cost associated with the imperative code would be the automatic generation of SQL (based on user parameters) and database connection management.

In this manner, the imperative code is defined by interpreted or compiled object code and the declarative code is a character string based on a SQL (Structured Query Language) syntax, which can be generated as output from the imperative code. Since the declarative code 152 does not define or compute a termination condition, following an occurrence of the termination condition, the imperative code simply ceases to issue additional SQL statements. If the condition is met, the imperative code stops the iteration. The (now trained) database is the ML model for inference (production) using the model. The output of the prior SQL statements (from the controlled iteration) will be a series of views/tables that are updated on each execution of each SQL statement. The final state of those tables and/or views represent the machine learning model. The database represents both the raw data as well as the resulting machine learning model at the end of this and all tables, views, rows, and columns therein. When the AI application 172 can invoke the model via the DBMS for a production phase, typically an inferential result.

Figure 6:
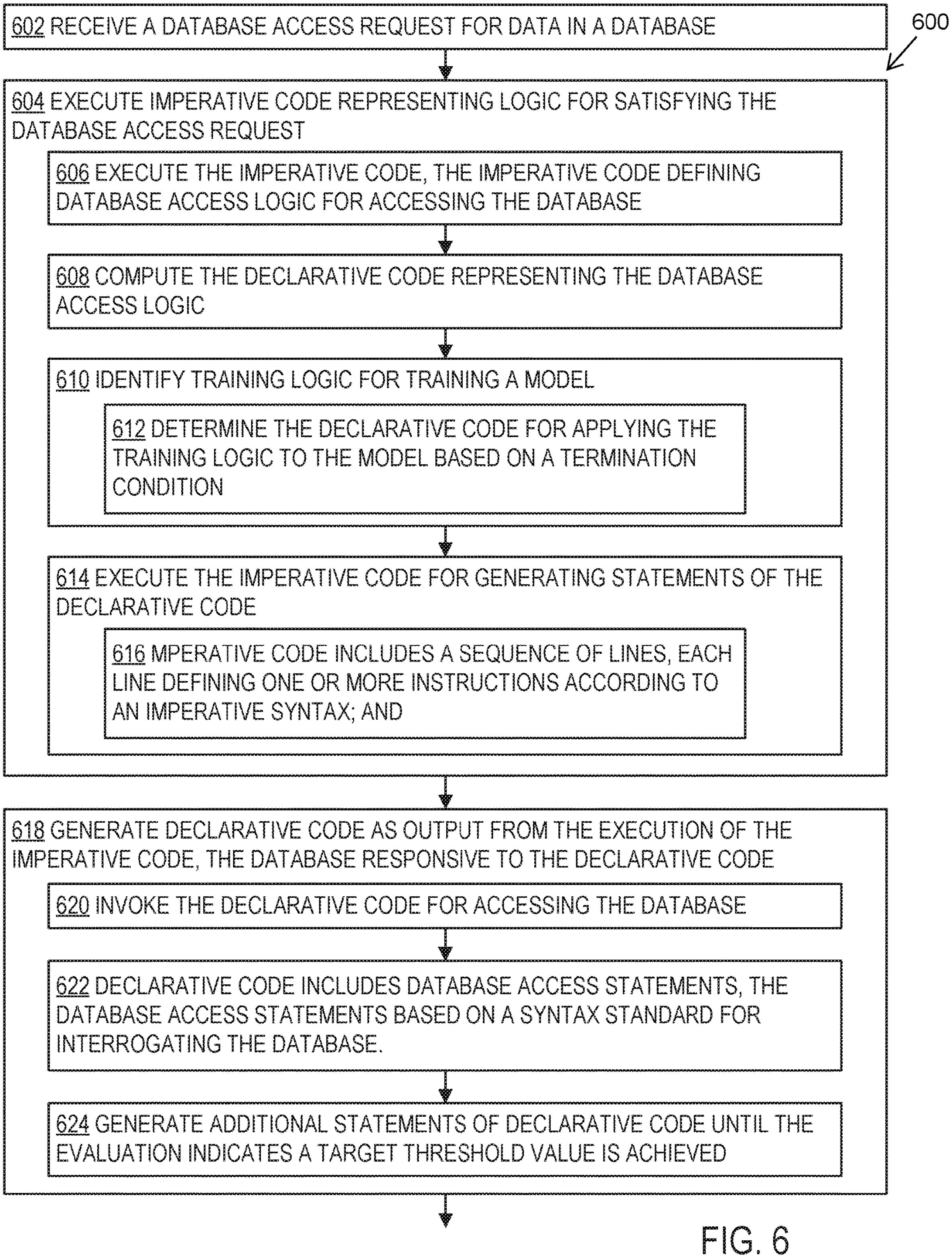
FIG. 6 is a flowchart of hybrid code operation according to FIGS. 3-5.
Figure 6:
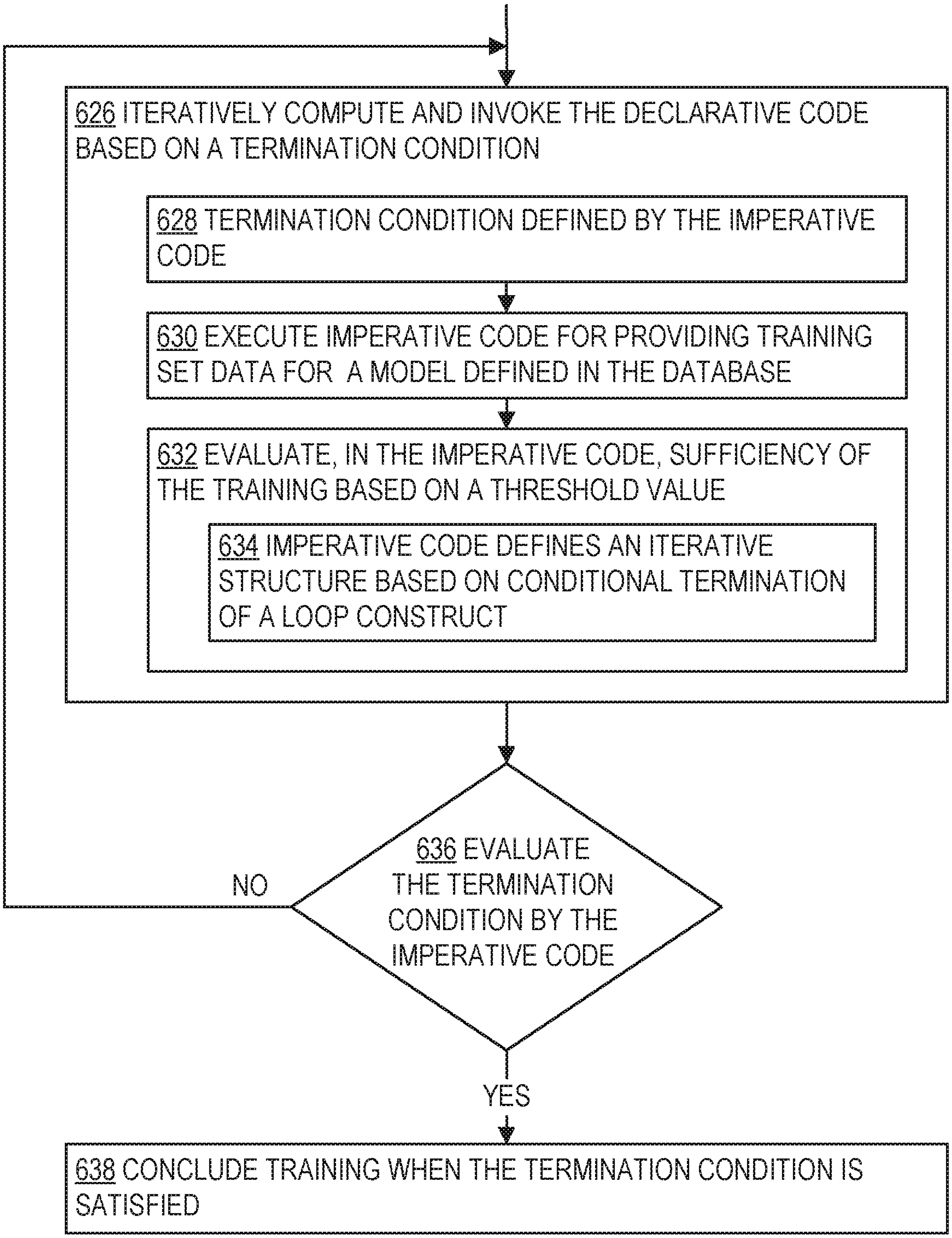

FIG. 6 is a flowchart of hybrid code operation according to FIGS. 3-5. A stepwise approach to training a ML model for deployment and inference is shown in a generalized flow 600. In a relational database environment having large databases responsive to declarative statements, a method for data access includes, at step 602, executing imperative code representing logic for training the model. This may be a python code segment or program, or another imperative language representation. In a particular configuration, the imperative code is defined by a series of lines of source code of a compiled or interpreted language that embodies at least the construction of SQL statements and the logic defining a completion of training based on sufficient iteration, as depicted at step 604 This code construction defines one or more instructions according to an imperative syntax.

During execution, the imperative code generates commands of declarative code, which may be text based SQL commands, as output from the execution of the imperative code, depicted at step 606. The declarative code so generated is such that the database is responsive to the declarative code, as in a Relational Database Management System (RDBMS) SQL implementation. The database executes the declarative code (SQL) in the database server, resulting in training of the model, shown at step 608. In each iteration, this may involve updating a database view to reflect the changes or result from the generated declarative code based on an iteration of training, as depicted at step 610. Following an iteration of training, the SQL code computes a termination value or condition based on a sufficiency of training the model, disclosed at step 612. This is typically defined as a value approaching a threshold, where each iteration brings the value closer to the threshold for indicating a sufficient number of iterations for training. The threshold value is typically computed on the database server side, from the generated SQL commands, and sent back over the network or connection to the client running the imperative code.

The client evaluates the termination condition via a comparison in the imperative code, as depicted at step 616. This is typically a value sent by the database server, to the client, and indicates convergence of a linear regression or similar result to a threshold value. Most computation for training the ML model is achieved by the robust capability of the SQL code, and usually only iteration needs to be controlled by the host. Based on the check at step 616, the client continues iteration via the imperative code which generates additional SQL commands in each subsequent training iteration, as depicted at step 614. After sufficient iterations to satisfy the termination conditions, usually based on approaching and satisfying a threshold value, the imperative code concludes that training is complete, as shown at step 618. The trained model is now ready for production or deployment for ML tasks.

As iterative training progresses, the hybrid code evaluates, in the imperative code, sufficiency of the training based on a threshold value, as disclosed at step 632. In the example configuration, the imperative code defines an iterative structure based on conditional termination of a loop construct, depicted at step 634. Conditional iteration and looping to attain a termination condition cannot be implemented in SQL, but the hybrid code effectively "wraps" the SQL generating code in an iterative structure for conditional looping and termination. A check is performed, at step 636, to evaluate the termination condition by the imperative code 154, and either redirects execution in an iterative form or concludes training when the termination condition is satisfied, as depicted at step 638.

Models produced in this manner as DB tables or views 132 can be represented in a multitude of ways, each of which has implications as to how the model can subsequently be used to make predictions (also known as inference). A model can be represented as a table in the database that captures the parameters of the model. Storing the model as such does not compute inference. The model can also be translated directly into SQL operations, views, or an AtScale semantic layer object for computing inference.

The proposed approach includes but is not limited to translation of machine learning models to SQL and related database constructs for computing inference directly in the database. This feature may include creation of database views and tables. This feature may also facilitate translation of machine learning models into database views, tables, or a semantic layer object for computing inference. This translation may be performed on machine learning models trained entirely in imperative code such as discussed above.

During model training in a machine learning algorithm, the number of iterations is variable and may require hybrid code. Once a model has been trained, it can be used to make predictions or inferences. Performing inference with a machine learning model generally does not require iteration or hybrid code. AI-Link provides support for translating a machine learning model into SQL operations for the purpose of computing inference.

A model can be encoded as a view within a database such that it performs inference on the table(s) referenced by that view. Table III shows an example of a simple linear regression model, and the model encoded as a view in the database. The view would compute the inference using the model where every row in the referenced table will have a row in the predictions view with a result in a column called "prediction."

TABLE III

| |
|---|
| 1. $Y = a + b_1X_1$ |
| 2. create view predictions as (select $a + b_1X_1$ as prediction from table) |

Other advantages of the disclosed approach include the following:

There is no requirement to install functions in the database whereas there is such a requirement for use of implementations that use UDFs.

Data scientists can perform machine learning entirely within Python (the most common programming language used in data science) but still reap the benefits of operations being executed (with SQL) inside a database rather than being limited by RAM on the machine executing the python code.

Hybrid code submits ANSI SQL which is compatible with multiple databases. AI-Link thereby supports machine learning algorithms executed in databases that do not natively support machine learning such as MySQL or SQLite.

Performance is optimized. Computation leverages optimizations of database query planners and engines that are written in C such that instructions are immediately translated to machine code and executed.

Computation cycles are minimized on the machine running the imperative programming language code. This means that machine learning can be run from "weaker" client machines that lack the specifications required for running machine learning algorithms implemented in other frameworks that perform all computation on the machine executing the imperative programming language code.

Databases natively support parallel connections and transactions, meaning algorithms can be parallelized for even better performance. Python is natively single threaded, and therefore frameworks must provide special implementations to parallelize workloads.

Concerns of memory management while running machine learning workflows are eliminated because they are offloaded to the database or data warehouse. By contrast, stack overflows while training very large machine learning models are common concerns when using imperative programming language implementations.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a relational database environment having large databases responsive to SQL (Structured Query Language) statements, a method for analytic processing, comprising:

invoking access to a database;

executing imperative code representing logic for accessing the database;

identifying training logic for training a model;

generating declarative code for applying the training logic to the model, the declarative code corresponding to a database query syntax as output from the execution of the imperative code, the database responsive to the declarative code;

executing the imperative code for generating statements of the declarative code for providing training set data for the model, the model defined in the database;

evaluating, in the imperative code, sufficiency of the training based on a threshold value defining a termination condition indicative of whether to execute the declarative code;

storing, by the imperative code, results of a calculated loss to determine the threshold value indicating whether to terminate the iteration and concluding training when the termination condition is satisfied; or repeating execution of the declarative code if the termination condition is not satisfied; and generating additional statements of declarative code until the evaluation indicates the target threshold value is achieved.

2. The method of claim 1 further comprising:

executing the imperative code, the imperative code generating database command logic for accessing the database; and iteratively generating and invoking the declarative code based on a termination condition.

3. The method of claim 1 further comprising:

iteratively generating declarative code from the imperative code based on a termination condition defined by the imperative code, the termination condition evaluated on a result of a previous execution of the declarative code.

4. The method of claim 1 wherein the imperative code defines an iterative structure based on conditional termination of a loop construct.

5. The method of claim 1 wherein the imperative code includes a sequence of lines, each line defining one or more instructions according to an imperative syntax; and the declarative code includes database instruction statements, the database instruction statements based on a declarative syntax.

6. The method of claim 1 wherein the imperative code defines a sequence including a forward pass, a backward pass, and a loss calculation, and the dataset defines features in an ML (Machine Learning) model, further comprising:

generating the declarative code for adjusting weights of the features;

generating the declarative code for computing a loss function defining a correspondence of the ML model to the dataset; and repeating the generation of the declarative code based on an iteration controlled by the imperative code and termination based on an evaluation of the loss function.

7. The method of claim 1 wherein the imperative code is defined by at least one of interpreted code or compiled object code and the declarative code is a character string based on a SQL (Structured Query Language) syntax.

8. The method of claim 1 further comprising:

determining iterative logic for training a model, the model defined by a database table of features and rows;

defining, based on the iterative logic, imperative code for implementing the logic for training the model;

submitting an instruction statement defined by declarative code and configured for accessing the database for implementing the iterative logic; and continuing executing the iterative logic until a termination condition is determined by the imperative code.

9. The method of claim 8 further comprising:

following an occurrence of the termination condition, receiving an inference request for determining an inferential result based on the trained model; and defining a view of the database table for computing a result of the inference request.

10. The method of claim 8 wherein the model is based on a linear regression applied to the features in the rows of the database table.

11. A system for training a data structure defining a ML (Machine Learning) model stored in a relational database, comprising:

a processor and memory in a computing device for executing imperative code representing logic for accessing the database;

training logic for training the model imperative code for generating declarative code for applying the training logic to the model, the declarative code corresponding to a database query syntax as output from the execution of the imperative code, the database responsive to the declarative code;

defining training set data for the model defined in the database;

imperative code for evaluating a sufficiency of training using the training set data based on a threshold value defining a termination condition indicative of whether to execute the declarative code, and generating additional statements of declarative code until the evaluation performed by the imperative code indicates a target threshold value is achieved;

a memory for storing, by the imperative code, results of a calculated loss to determine the threshold value indicating whether to terminate the iteration; the imperative code configured to:

conclude training when the termination condition is satisfied; or repeat execution of the declarative code if the termination condition is not satisfied.

12. The system of claim 11 wherein the computing device is configured for executing the imperative code, the imperative code defining database command logic for accessing the database;

generating the declarative code representing the database command logic; and invoking the declarative code for accessing the database; and iteratively computing and invoking the declarative code based on a termination condition.

13. The system of claim 11 further comprising:

declarative code generated from the imperative code based on a termination condition defined by the imperative code, the imperative code generating the declarative code in a loop until the imperative code terminates the loop.

14. The system of claim 11 wherein the imperative code defines an iterative structure based on conditional termination of a loop construct.

15. The system of claim 11 further comprising iterative logic for training a model, the model defined by a database table of features and rows, the features corresponding to columns in the database table;

the iterative logic defining imperative code for implementing a plurality of database commands;

the imperative code for computing an instruction statement defined by declarative code and configured for accessing the database for implementing the iterative logic, and continuing executing the iterative logic until a termination condition is determined by the imperative code;

an inference request for, following an occurrence of the termination condition determining an inferential result based on the trained model; and defining a view of the database table for computing a result of the inference request, the trained model defining a neural network applied to the features in the rows of the database table.

16. A computer program embodying program code on a non-transitory storage medium that, when executed by a processor, performs steps for implementing a method for data access in a relational database environment having large databases responsive to declarative statements, the method comprising:

executing imperative code representing logic for accessing the database;

identifying training logic for training a model;

generating declarative code for applying the training logic to the model, the declarative code corresponding to a database query syntax as output from the execution of the imperative code, the database responsive to the declarative code;

executing the imperative code for generating statements of the declarative code for providing training set data for the model, the model defined in the database;

evaluating, in the imperative code, sufficiency of the training based on a threshold value defining a termination condition indicative of whether to execute the declarative code;

storing, by the imperative code, results of a calculated loss to determine the threshold value indicating whether to terminate the iteration and concluding training when the termination condition is satisfied; or repeating execution of the declarative code if the termination condition is not satisfied; and generating additional statements of declarative code until the evaluation indicates the target threshold value is achieved.

17. The method of claim 1 further comprising:

modifying model weights of a neural network, the model weights stored in the database; and calculating a result of a loss function, the loss function measuring how well the model fits a data set.

18. The method of claim 17 further comprising:

executing the declarative code on the database, the executed declarative code operative to modify the model weights of the neural network;

reading from the database the result of the loss function, the result read by the imperative code; and comparing the result of the loss function to a threshold value.

19. The method of claim 18 further comprising:

iteratively modifying the model weights of the neural network and calculating a respective result of the loss function; and stopping iteration when the respective result of the loss function is greater than the threshold value.

20. The method of claim 1 further comprising:

terminating the generation of the declarative code based on achieving the target threshold.

* * * * *